3,441,204
DEVICE FOR INDICATING SLUDGE LEVEL IN SLUDGE CENTRIFUGES
Ove Allan V. Kjellgren, Stockholm, and Carl-Göran Nilson, Tullinge, Sweden, assignors to Alfa-Laval AB, Tumba, Sweden, a corporation of Sweden
Filed July 8, 1966, Ser. No. 563,739
Claims priority, application Germany, Aug. 27, 1965, A 50,122
Int. Cl. B04b *11/02, 15/00;* G01f *23/00*
U.S. Cl. 233—21      2 Claims

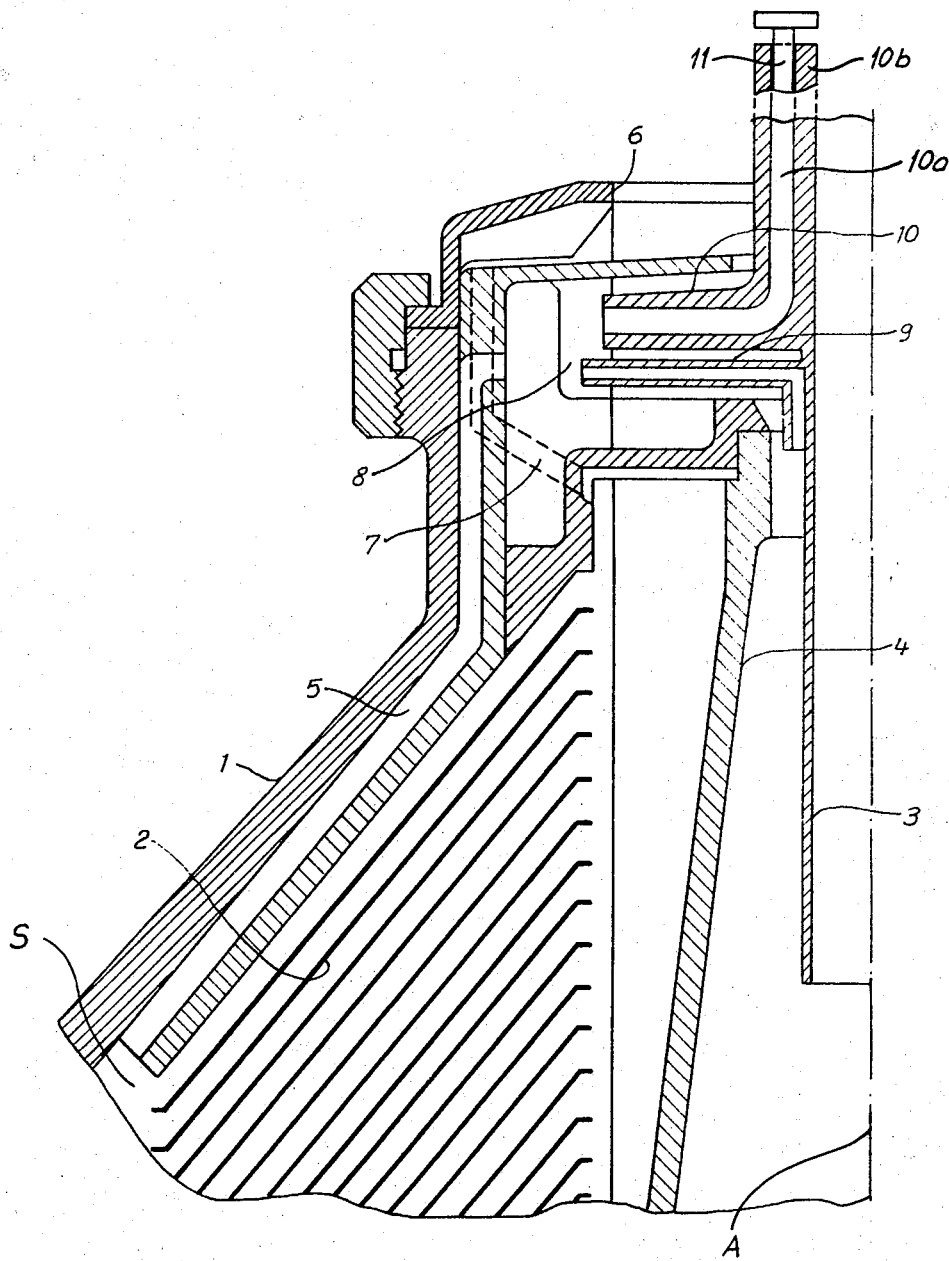

ABSTRACT OF THE DISCLOSURE

The centrifugal rotor has an indicating channel with a radially outer end opening into the sludge-collecting space and a radially inner end opening into a paring chamber. First and second paring devices have their respective paring edges located in the paring chamber with the second paring edge at a greater radius from the rotor axis than the first paring edge, so that clogging of the indicating channel with sludge causes the first paring channel to be rapidly uncovered by liquid in the paring chamber, due to the paring action of the second paring edge. Indicating means communicate with the first paring channel and are operable in response to this uncovering of the first paring channel.

---

The present invention relates to sludge centrifuges and more particularly to an improved device for indicating the sludge level in the sludge space of the centrifugal rotor.

It is known in the art to provide the rotor of a sludge centrifuge with an indicating channel leading from the sludge space inwardly toward the center of the rotor and, which by means of a paring device located in a paring chamber, is connected to a duct outside the centrifuge, a pressure or flow sensing means being inserted in the duct to indicate the clogging of the opening of the indicating channel into the sludge space. U.S. Patent No. 3,167,509, dated Jan. 26, 1965, describes such a device. In order to give a distinct indicating signal, the paring channel of the indicating device has a throttled communication with the central part of the rotor so that when the opening of the indicating channel into the sludge space becomes clogged with sludge, the liquid column in the paring channel is rapidly discharged through said communication, whereby the pressure decrease in the paring channel is accelerated.

Accordng to the present invention, the indicating signal is made more distinct than that in the prior art device by providing in the paring chamber an additional paring device, the paring edge of which is located at a greater radius from the rotor axis than is the paring edge of the first paring device.

In the prior art device, the liquid level travels outwardly after the indicating channel has been clogged. The rate of this travel gradually decreases until the liquid level reaches the outer edge of the paring device; and the liquid level is not changed thereafter despite the aforementioned throttled communication. Because of this fact, the pressure decrease in the paring channel takes place relatively slowly.

According to the present invention, after the opening of the indicating channel becomes clogged, the liquid level in the paring chamber travels rapidly outward past the outer edge of the first paring device, to which the pressure or flow sensing means is connected, and its outward travel stops only at the outer edge of the additional paring device. In this way, the opening of the first paring device into the paring chamber is uncovered, so that the liquid in the paring channel of this paring device is rapidly discharged through this opening and the indicating signal is made more distinct.

The liquid discharged through the additional paring device can be allowed to go to drain or, if it is of value, returned to the separating space of the centrifuge.

The invention is described more in detail below in reference to the accompanying drawing, in which the single illustration is an axial sectional view of part of a centrifugal rotor embodying an example of the invention.

In the drawing, a centrifugal rotor 1 is adapted to be driven in rotation about a central vertical axis A. The separating chamber of the rotor contains a conventional set of conical disks 2. The feed material is admitted to the rotor through a central stationary inlet pipe 3, from which it passes by way of the usual distributor 4 of the rotor to the separating chamber and its disks 2. An indicating channel 5 in the rotor opens at its radially outer end into a sludge space S at the peripheral portion of the rotor, and opens at its radially inner end into a paring chamber 8. Separated liquid passes through a channel 7 leading from the inner edges of the disks 2 to an overflow outlet 6.

The paring chamber 8 is provided with two stationary paring disks 9 and 10, which are shown secured to feed pipe 3. The lower paring disk 9 feeds the liquid, which it has pared from chamber 8, back to the separating space of the rotor via the distributor 4; and the paring edge of disk 9 is at a greater radius from rotor axis A than is the paring edge of disk 10. The channel 10a of the paring disk 10 communicates with a pressure or flow sensing means which, as shown, comprises a piston 11 slidable in a part 10b forming an extension of this channel.

The liquid to be separated is supplied from above through the pipe 3 and reaches the separating space of the rotor via the distributor 4. The purified liquid travels inwardly through the disk set 2 and is discharged at the overflow outlet 6. The sludge separated centrifugally from the liquid collects in the sludge space S. During normal operation, liquid also flows radially inward through the channel 5 to the paring chamber 8. Liquid is continuously discharged from this chamber through the paring disk 9 and returned to the separating space. At the same time, the channel 10a of the paring disk 10 will contain a column of liquid due to the fact that the paring edge of this disk is immersed somewhat in the rotating annular body of liquid in chamber 8; but no flow takes place through channel 10a as long as the indicating channel 5 does not become clogged. Thus, the indicating means 11 will have a raised position, as shown, indicating a certain value.

When the level of the sludge collecting in the sludge space S reaches the outer opening of the channel 5, this opening will be clogged by the sludge so that the liquid flow through the channel 5 ceases. As soon as this flow has ceased, the paring disk 9 rapidly discharges a liquid quantity corresponding to the level difference between the outer or paring edge of the paring disks 9 and 10. As a result, the opening of the paring channel 10a into paring chamber 8 is uncovered so that the liquid column in this channel is rapidly discharged into the paring chamber, whereby piston 11 of the sensing means descends rapidly. In this way, a rapid and distinct indication is provided when the preselected sludge level is attained, so that steps can be taken to discharge the sludge in a conventional manner.

It will be apparent that many modifications may be made within the spirit and scope of our invention and, accordingly, we do not wish to be limited otherwise than as indicated by the terms of the appended claims.

We claim:

1. In a sludge centrifuge, the combination of a rotor adapted to be driven about a central axis and having a feed inlet leading to a separating chamber in the rotor, the rotor having an outlet for liquid separated in said chamber and also having a peripheral sludge space for accumulating sludge separated in said chamber, the rotor also having a paring chamber and an indicating channel, said channel having a radially outer end opening into the sludge space and having a radially inner end opening into said paring chamber, first and second paring devices having, respectively, first and second paring edges located in the paring chamber and first and second paring channels leading from the respective paring edges, said second paring edge being located at a greater radius from said axis than is said first paring edge, whereby upon clogging of said indicating channel with sludge said second paring device causes said first paring channel to be rapidly uncovered by liquid in the paring chamber, and indicating means communicating with said first paring channel and operable in response to said uncovering of the first paring channel.

2. The combination of claim 1, in which said second paring channel is positioned to return pared liquid to said separating chamber.

References Cited
UNITED STATES PATENTS

| | | | |
|---|---|---|---|
| 3,135,691 | 6/1964 | Hemfort | 233—19 |
| 3,167,509 | 1/1965 | Steinacker | 233—20 |

HENRY T. KLINKSIEK, *Primary Examiner.*